June 23, 1964   W. L. LOVETT, JR   3,138,350
DUCTED FAN AIRCRAFT AND ENGINE
Filed April 4, 1963   3 Sheets-Sheet 1
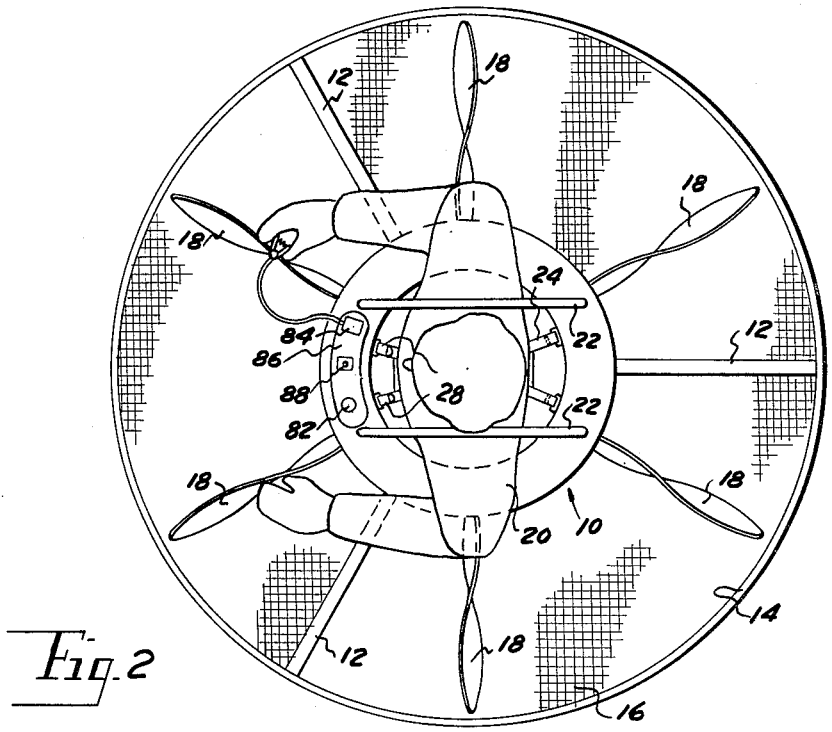
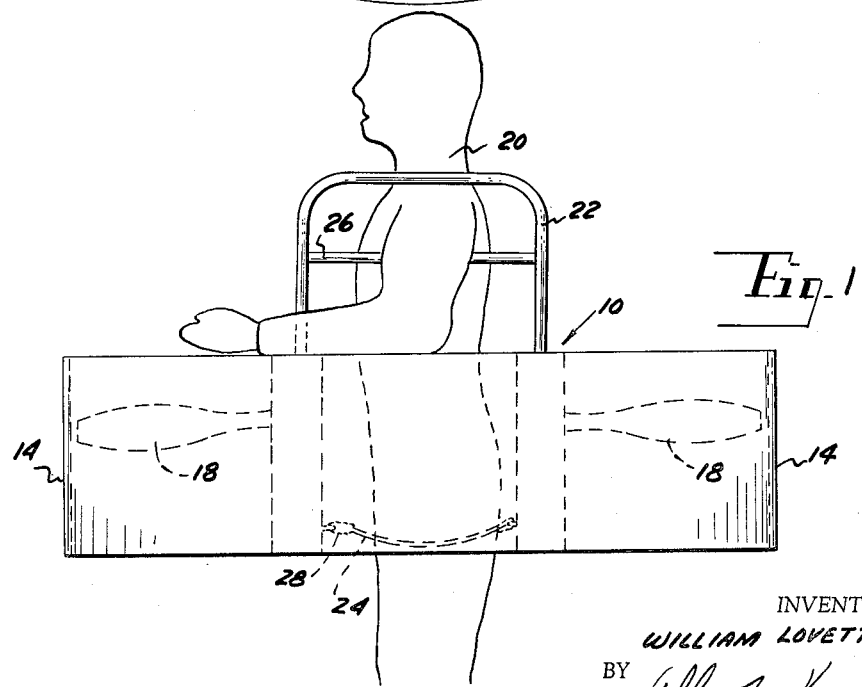
INVENTOR.
WILLIAM LOVETT JR.
BY
ATTORNEY June 23, 1964   W. L. LOVETT, JR   3,138,350
DUCTED FAN AIRCRAFT AND ENGINE
Filed April 4, 1963   3 Sheets—Sheet 2

INVENTOR.
WILLIAM LOVETT JR.
BY
ATTORNEY

June 23, 1964  W. L. LOVETT, JR  3,138,350
DUCTED FAN AIRCRAFT AND ENGINE
Filed April 4, 1963  3 Sheets-Sheet 3

INVENTOR.
WILLIAM LOVETT JR.
BY
ATTORNEY

United States Patent Office 3,138,350
Patented June 23, 1964

3,138,350
DUCTED FAN AIRCRAFT AND ENGINE
William L. Lovett, Jr., 44097 Marlson, Novi, Mich.
Filed Apr. 4, 1963, Ser. No. 270,755
6 Claims. (Cl. 244—23)

This invention relates to a ducted fan aircraft and to an engine for such an aircraft having an annular configuration so that the pilot may be supported centrally within the annular engine.

The desirability of providing a personal aircraft which is capable of supporting a single man, and utilizes a minimum of parts, is well recognized. A variety of such craft have been formed using the ducted fan principle, wherein a propellor rotates in a horizontal plane about a vertical axis within an annular shroud which confines the air mass and directs it downwardly so as to provide lift through the combination of Bernouli's effect and the air cushion principle. The present invention relates to such an aircraft and has as its principal object to provide a unit having an annular configuration, so that the pilot may be supported centrally within the annulus in such a manner that his legs substitute for the normal landing gear, and his trunk is so positioned that he may easily manipulate controls disposed on the annulus.

In order to achieve this primary object, it is necessary to provide an engine having an annular configuration. Utilizing such an engine, a pilot may be supported on the interior and the propellor blades may be attached to the exterior of the annulus so as to rotate between the annulus and a shroud of greater diameter. The shroud is connected to and supported by the engine through struts which connect the two. The pilot is supported on a frame and straps on the interior of the annular engine so that his legs extend below the engine and the major portion of trunk above the engine.

It has previously been proposed to provide an aircraft formed with an annular central support for the pilot with propellors extending outwardly from the annulus. For example, U.S. Patent No. 2,920,841, discloses a helicopter wherein the propellor is driven by jet engines disposed at the tips of each blade. The disadvantages of this aircraft, which include inability of the pilot to resist the large gyroscopic forces generated and the extreme weight of the configuration, are largely solved by the present invention's use of a ducted fan levitation principle and the annular engine used to power the present aircraft.

The annular engine which is basic to the preferred embodiment of the invention, and which will subsequently be described in detail, utilizes the gas turbine principle. An annular turbine wheel has a circle of buckets or blades disposed about its lower edge. A plurality of combustion chambers which are spaced at regular intervals with respect to the wheel, direct a high velocity, high temperature gas flow at the blades so as to cause the turbine wheel to rotate about a vertical axis. The wheel is suspended within the engine frame in such a manner that the high pressure blast from the combustion chambers is employed to form a gas bearing for a wheel. In addition to the direct blast supporting the wheel in an upper direction, a portion of the combusted gases are directed through vents in the wheel, disposed between the blades, to the upper side of the wheel so as to provide an air cushioning effect on all sides. The exhausted gas is directed radially outward.

The turbine engine employs an air intake disposed in the stream of the propellors and a fuel pumping system driven by impellers connected to the air bearing area. Auxiliary manual fuel pumping means are employed to start the engine, along with a battery-powered ignitor.

It is therefore seen to be an object of the present invention to provide a ducted fan aircraft employing an annular motor and adapted to support the pilot within the annulus in such a manner that his legs may replace landing gear.

Another object is to provide such an engine employing the gas turbine principle which is simple in construction, light in weight, and low in cost.

Other objects, advantages, and applications of the present invention will be made apparent by the following detailed description of a preferred embodiment. The description makes reference to the accompanying drawings in which:

FIGURE 1 is an elevation view of the preferred embodiment of my ducted fan aircraft showing the manner of disposition of the pilot therein;

FIGURE 2 is a top plan view of the aircraft;

Figure 3:
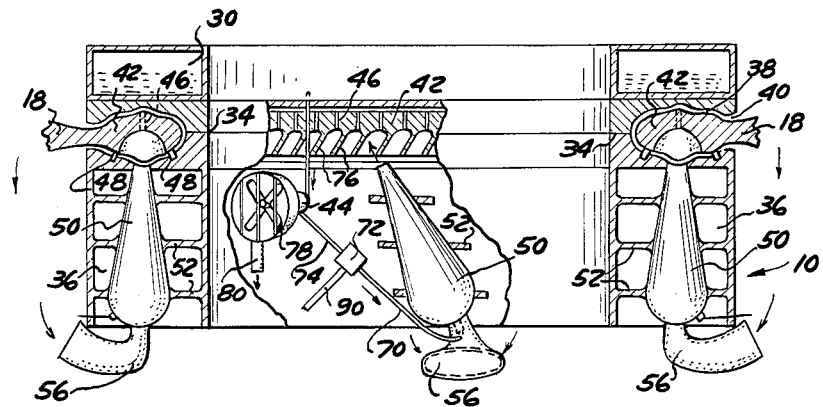
FIGURE 3 is an elevation view of the engine broken away to reveal certain sections.
Figure 4:
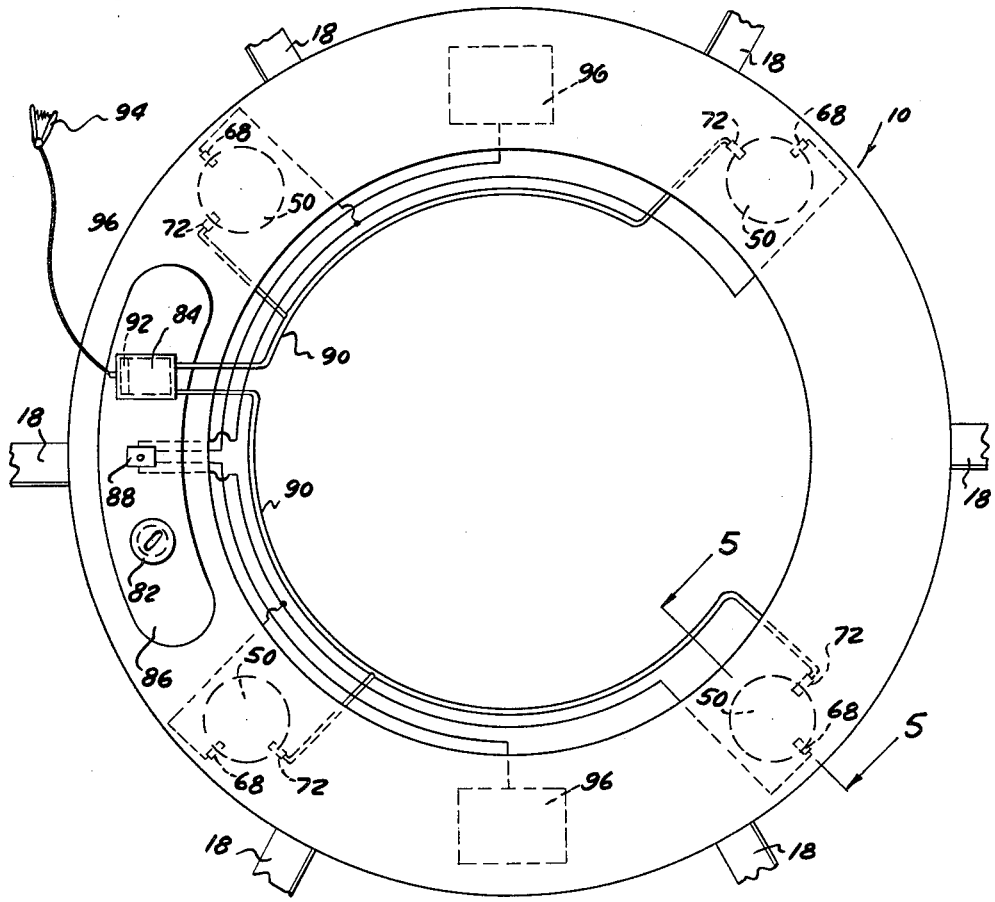
FIGURE 4 is a top view of the engine showing certain of the elements thereof in phantom.

The preferred embodiment of the invention is formed about an annular engine generally indicated at 10. The engine carries a plurality of struts disposed at equal angular intervals which connect its upper edge to an annular shroud 14. The shroud is formed of a circle of sheet material lying in the vertical plane. The top of the aircraft between the shroud 14 and the engine 10 is covered by a wire mesh 16 (shown broken away) which protects the pilot from contact with the propellor blades.

The propellor blades 18 project from the engine 10 and extend from its outer edge to points immediately adjacent the shroud 14. Six propellors are disclosed in the preferred embodiment, but the number of propellors and their exact configuration may be determined in accordance with the best engineering practice.

The pilot 20 is supported within the annular center of the engine 10 by means of a shoulder frame 22 and a crotch strap 24. The frame 22 consists of a set of bars formed in an inverted U-shape which extend between opposite sides of the annulus. A pair of cross-bars 26 extend between opposed legs of each of the frame members 22. The configuration of the bars 22 and 26 is such that the pilot may be supported with his arms extending over the cross-bars 26 and below the top members of the bars 22. His head will project between the bars. The crotch belt 24 may be formed of a woven material and extends between diametrically opposed points on the lower edge of the engine 10. A buckle 28 allows quick removal of the straps which may be connected so as to form a straddling seat for the pilot.

The annular engine 10 which rotates the propellor blades 18 is symmetrical about a vertical axis. The top of the annulus which forms the engine 10 is occupied by a fuel tank 30, extending entirely around the annulus. A turbine wheel housing 34 which may be formed of a pair of complementary rings is disposed immediately below the fuel tank 30. A combustion equipment support housing 36, which is generally hollow, forms the lower section of the annular engine 10.

The wheel support block 34 contains an annular cavity 38 which communicates with a circumferential opening 40 in the side wall of the engine. An annular turbine wheel 42 is supported within this opening 38, and carries the propellor blades 18 which extend through the opening 40. The sides of the cavity 38 journal the turbine wheel 42.

The wheel 42 carries a series of buckets 44 within its lower side. These buckets 44 may be formed integrally with the wheel, but are preferably constructed of a ceramic-metal material which is capable of withstanding high temperatures without deformation. The buckets 44 are disposed at an inclination with respect to the vertical axis.

A series of vent holes 46 are formed in the ring, one between each pair of blades 44. The vent holes connect the area between the blades with the upper end of the wheel 44. When at rest, the turbine wheel 42 is supported by a series of roller bearings 48 which are journaled in the lower half of the wheel block 34 so as to extend into the lower side of the cavity 38. These bearings 48 provide a low friction support for the turbine wheel 42 at the time of starting of the engine. After the engine has attained operating speed the wheel 42 is supported by an air cushion, in a manner which will be subsequently described.

Figure 5:
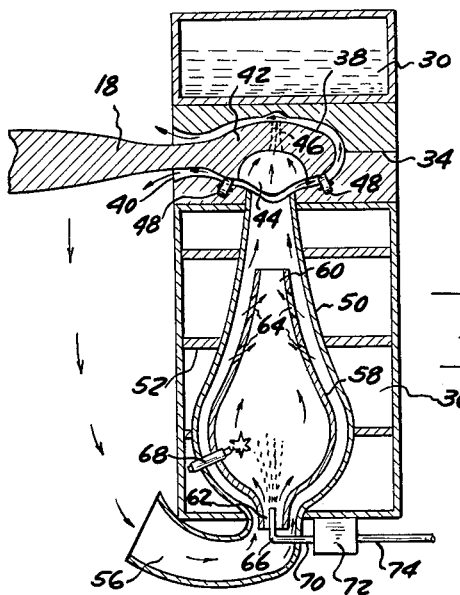
FIGURE 5 is a detailed cross section of the engine annulus taken through a combustion chamber on lines 5—5 of FIGURE 4.

A plurality of combustion chambers 50 are supported within the lower frame 36 by struts 52 which extend between the edges of the frame. While the four combustion chambers are utilized in the preferred embodiment, this number may be varied in accordance with the specific characteristics of the aircraft. As is seen in FIGURE 3, the combustion chambers 50 take the form of an elongated flask section with a central axis inclined with respect to the vertical in a circumferential direction. FIGURE 5 best illustrates the construction of the combustion chamber.

The upper end of each combustion chamber flask 50 opens to the lower edge of the annular chamber 38 directly below the turbine buckets 44. The lower end of the flask connects to an air scoop 56 which extends radially outward so as to capture a portion of the draft caused by the rotation of the propellor blades 18. As the combustion chambers are identical, only one will be described.

A central combustion chamber lining 58 is smaller than the outer flask 50 and is supported centrally within its flask. It is preferably formed of a refractory material and its upper nozzle end 60 communicates with the upper open end of the flask 50 so as to direct its blast toward the buckets 44. A lower open end 62 of the chamber 58 is disposed within the air scoop 56. The lower open end 62 does not block the entire end of the air scoop and a portion of the air is passed into the chamber 58 and another portion passes around its outer walls through a space between the chambers 50 and 58. A portion of this by-passed air proceeds into the upper end of the chamber 58 through holes 64 and another portion continues to by-pass the chambers and is mixed with the exhaust passing through the nozzle 60. This added air acts to insulate the chamber 58 and also to increase the velocity and heat content of the exhausted gases.

A fuel injection nozzle 66 is supported within the open end 62 of the chamber 58. Fuel is pumped through the nozzle 66 and is drawn into the chamber by the Venturi effect which is created by the narrow chamber opening 62. An ignitor 68 is disposed in the wall of the inner chamber 58 and acts to initiate combustion in the chamber at the time of starting of the engine.

The fuel is emitted to the nozzle 66 from a line 70 which exists from a throttle valve 72. The input to the throttle valve is from a line 74 which carries the output of an impeller driven pump 76. One impeller 78 and pump 76 is provided for each combustion chamber 50. The input to the pump 76 is from the fuel tank 30.

The impeller 78 comprises a gas driven fan which has input from the combustion gases carried in the bucket section of the turbine wheel 42. The output of each impeller is to the atmosphere through lines 80.

Fuel is initially pumped to the engine through a hand-powered unit 82 which provides a small flow of fuel in each of the chambers through connections which are not shown. After the engine starts up the impellers 78 drive the fuel pumps 76 to supply fuel to the engine. The throttle valves 72 control the supply of fuel, and therefore the speed of the engine.

The throttle valves 72 are all manipulated in unison by means of a hydraulic system powered from a cylinder 84. The cylinder 84 is disposed on a control panel 86 along with the hand pump 82 and an ignition switch 88. The cylinder 84 contains hydraulic fluid and connects to each of the throttle valves by means of a pair of lines 90. A piston 92 is movable within the cylinder 84 and may be actuated by a hand-grip member 94 connected to the piston through a mechanical linkage 96. The pilot grasps the handle 94 and by controlling the position of the piston 92 within the cylinder 84 controls the application of hydraulic fluid to the various throttle valves 72. These valves control the flow of fluid from the impeller driven pumps 76 to the combustion chambers 50. By completely closing the throttle valves the engine is turned off.

Ignitors 68 are all connected to an ignition switch 88 on the control panel 86. A pair of batteries 96 disposed within the frame 36 provide power for the ignitors.

When starting the engine, fuel is applied to the cylinders by the hand pump 82 and the ignitors 68 are actuated by means of the switch 88. Combustion then starts in the engine and the impellers 78 are rotated driving fuel to each of the combustion chambers and maintaining the ignition. The rotation of the propellors 18 provides lift to the vehicle and also forces air into the scoops 56 to support the combustion. The blasts from the nozzle 60 are directed against the buckets 44, causing the propellors to rotate. This blast also lifts the turbine 42 within the annular section 38. A portion of the blast is also directed through the holes 46 of the turbine wheel. The effect is to provide pressurized air on all sides of the turbine wheel. Since the pressure is slightly great on the lower side so as to overcome the force of gravity, an air cushion is provided and extremely low friction for the rotation of the turbine wheel is realized.

The pilot has control over the speed of the engine and therefore the lift by means of the throttle valve actuator 94. Forward motion may be achieved by the pilot bending his body so as to exert unbalanced forces on the vehicle to achieve a desired motion.

Whatever counter torque is developed may be negatived, if necessary, by the use of any well-known means, such as counter-rotating propellers or the like. This might be accomplished, for example, by employing elongated vanes attached to the bottom of the shroud and adapted to produce a counter torque as the turbine rotates.

Having thus described my invention, I claim:

1. An aircraft comprising: an annular frame; engine means mounted with respect to said frame; a plurality of propellor blades supported for revolution about the axis of said frame, powered by said engine; a cylindrical shroud supported with respect to said frame exteriorly of said propellor blades so as to surround them; and pilot supporting means disposed radially inward of the frame, operative to support a pilot so that his legs extend beyond the frame in one direction and a portion of his trunk extends beyond the frame in the other direction.

2. A one-man aircraft comprising: an annular engine; an annular turbine wheel forming part of the engine; a plurality of propellor blades attached to the turbine wheel and extending outward radially therefrom; an annular shroud having a diameter sufficient to encompass the propellor blades; means for supporting the shroud coaxially with respect to the engine; and apparatus for supporting the pilot radially inward of the engine, so that his legs extend beyond the frame in one direction and a portion of his trunk extends beyond the frame in the other direction.

3. An aircraft comprising: an annular frame; a turbine engine supported on said frame and including an annular turbine wheel supported for rotation about the central axis of said frame; a plurality of propellor blades attached to said turbine wheel and extending radially outward from said frame at regular angular intervals; a cylindrical shroud disposed radially outward of said blades, supported by said frame; and pilot supporting means disposed radially inward of said frame, so that his legs extend beyond the frame in one direction and a portion of his trunk extends beyond the frame in the other direction.

4. A one-man aircraft comprising: an annular frame; pilot supporting means disposed radially inward of the frame, operative to support a pilot so that his legs extend beyond the frame in one direction and a portion of his trunk extends beyond the frame in the other direction; a turbine wheel having a series of turbine blades disposed thereon fixed for rotation within said frame; a plurality of combustion chambers disposed with respect to said frame so as to direct their output at the turbine wheel and cause it to rotate; a plurality of propellor blades fixed to said turbine wheel and extending radially outward from the frame at regular intervals with respect to one another; and a cylindrical shroud surrounding said blades and supported with respect to said frame.

5. A one-man aircraft comprising: an annular frame; pilot supporting means disposed radially inward of the frame, operative to support the pilot so that his legs extend beyond the frame in one direction and a portion of his trunk extends beyond the frame in the other direction; an annular cavity in said frame including an opening in the radially outer edge of said frame; a turbine wheel having a series of turbine blades disposed thereon rotatably supported within said cavity; a plurality of propeller blades fixed to said turbine wheel and extending radially outward from the frame at regular intervals with respect to one another; a plurality of combustion chambers supported at regular intervals along the frame so as to direct their output at the turbine wheel and cause it to rotate; and a cylindrical shroud surrounding said blades and supported with respect to said frame.

6. A one-man aircraft comprising: an annular frame; pilot supporting means disposed radially inward of the frame, operative to support the pilot so that his legs extend beyond the frame in one direction and a portion of his trunk extends beyond the frame in the other direction; an annular cavity in said frame including an opening in the radially outer edge of said frame; a turbine wheel having a series of turbine blades disposed thereon rotatably supported within said cavity; a plurality of propellor blades fixed to said turbine wheel and extending radially outward from the frame at regular intervals with respect to one another; a plurality of combustion chambers supported by the frame at regular intervals thereon so as to direct their output at the turbine wheel and cause it to rotate; manually actuable means for supplying fuel to each of the combustion chambers and initiating ignition in said combustion chambers; and means driven by the exhaust of the turbine for supplying fuel to the combustion chambers during the operation of the engine.

References Cited in the file of this patent

UNITED STATES PATENTS

| | | |
|---|---|---|
| 2,417,896 | Zimmerman | Mar. 25, 1947 |
| 2,541,098 | Redding | Feb. 13, 1951 |
| 2,740,595 | Bakewell | Apr. 3, 1956 |
| 2,779,531 | Wheatley | Jan. 29, 1957 |
| 2,920,841 | Junker | Jan. 12, 1960 |
| 2,936,973 | Kappus | May 17, 1960 |
| 2,953,321 | Robertson et al. | Sept. 20, 1960 |
| 3,002,675 | Howell et al. | Oct. 3, 1961 |
| 3,018,034 | Ferri | Jan. 23, 1962 |
| 3,023,980 | Martin et al. | Mar. 6, 1962 |
| 3,033,492 | Rowe | May 8, 1962 |
| 3,039,718 | Bohr | June 19, 1962 |